(12) United States Patent
Yu et al.

(10) Patent No.: US 11,882,302 B2
(45) Date of Patent: *Jan. 23, 2024

(54) TRANSFORM SELECTION IN A VIDEO ENCODER AND/OR VIDEO DECODER

(71) Applicant: Telefonaktiebolaget LM Ericsson (publ), Stockholm (SE)

(72) Inventors: Ruoyang Yu, Täby (SE); Rickard Sjöberg, Stockholm (SE); Zhi Zhang, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/127,359

(22) Filed: Mar. 28, 2023

(65) Prior Publication Data

US 2023/0239486 A1 Jul. 27, 2023

Related U.S. Application Data

(63) Continuation of application No. 17/531,128, filed on Nov. 19, 2021, now Pat. No. 11,627,329, which is a
(Continued)

(51) Int. Cl.
*H04N 19/44* (2014.01)
*H04N 19/159* (2014.01)
(Continued)

(52) U.S. Cl.
CPC ........... *H04N 19/45* (2014.11); *H04N 19/159* (2014.11); *H04N 19/176* (2014.11); *H04N 19/186* (2014.11)

(58) Field of Classification Search
CPC .... H04N 19/45; H04N 19/159; H04N 19/176; H04N 19/186; H04N 19/61; H04N 19/12; H04N 19/11
See application file for complete search history.

(56) References Cited

U.S. PATENT DOCUMENTS

2006/0165170 A1 7/2006 Kim
2013/0003828 A1 1/2013 Cohen
(Continued)

FOREIGN PATENT DOCUMENTS

CN 107211144 9/2017
CN 107257456 10/2017
(Continued)

OTHER PUBLICATIONS

Kai Zhang et al., "Multi-model Based Cross-component Linear Model Chroma Intra-prediction for Video Coding", VCIP, St. Petersburg, U.S.A., Dec. 2017 (4 pages).
(Continued)

*Primary Examiner* — Jared Walker
(74) *Attorney, Agent, or Firm* — Rothwell, Figg, Ernst & Manbeck, P.C.

(57) ABSTRACT

A process for selecting a transform set for a prediction block. The process can be used in both an encoder and a decoder. For example, the process can be used in both an encoder and a decoder for a prediction block that has been predicted from a reference block. In some embodiments, both the prediction block and the reference block are intra blocks.

19 Claims, 9 Drawing Sheets

Related U.S. Application Data continuation of application No. 16/637,967, filed as application No. PCT/EP2019/068548 on Jul. 10, 2019, now Pat. No. 11,218,716.

(60) Provisional application No. 62/697,484, filed on Jul. 13, 2018.

(51) Int. Cl.
*H04N 19/176* (2014.01)
*H04N 19/186* (2014.01)

(56) References Cited

U.S. PATENT DOCUMENTS

| | | |
|---|---|---|
| 2013/0188703 A1 | 7/2013 | Liu |
| 2015/0063438 A1 | 3/2015 | Kim |
| 2016/0286241 A1 | 9/2016 | Ridge |
| 2017/0094314 A1 | 3/2017 | Zhao |
| 2018/0020218 A1 | 1/2018 | Zhao |
| 2018/0288413 A1 | 10/2018 | Filippov |
| 2018/0295364 A1 | 10/2018 | Liu |

FOREIGN PATENT DOCUMENTS

| | | |
|---|---|---|
| CN | 108141596 | 6/2018 |
| CN | 109691101 | 4/2019 |
| EP | 2805496 | 11/2014 |
| JP | 2015515821 | 5/2015 |
| RU | 2604669 | 12/2016 |
| WO | 94/22108 | 9/1994 |
| WO | 2016/123091 | 8/2016 |
| WO | 2020/011860 | 1/2020 |

OTHER PUBLICATIONS

Jianle Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, Document JVET-G1001-v1, 7$^{th}$ Meeting: Torino, IT Jul. 13-21, 2017 (7 pages).

International Search Report and Written Opinion dated Nov. 12, 2019 issued in International application No. PCT/EP2019/068548. (16 pages).

Chen, J. et al., Algorithm Description of Joint Exploration Test Model 7 (JEM 7). Joint Video Exploration Team (JVET) of ITU-T SG 16 WP 3 and ISO/IEC JTC 1/SC 29/\iVG 11; 7th Meeting: Torino, IT; Document: JVET-G1001-v1 (Jul. 2017). (48 pages).

Lin, Y. et al., "Prediction dependent transform for intra and inter frame coding"; Joint Video Exploration Team (JVET) of ITU-T SG 16 WP 3 and ISO/IEC JTC 1 /SC 29/WG 11; 10th Meeting: San Diego, US; Document: JVET-J0064_r1 (Apr. 2018). (6 pages).

Zhao, X,, "BoG report on CE6 related contributions", Joint Video Experts Team (JVET) of ITU-T SG 16 WP 3 and ISO/IEC JTC 1/SC 29/WG 11; 15th Meeting: Gothenburg, SE; Document: JVET-O1115-v3 (Jul. 2019). (29 pages).

Zhang, Z. et al., "Non-CE6: On LFNST transform set selection for a CCLM coded block", Joint Video Experts Team (JVET) of ITU-T SG 16 WP 3 and ISO/IEC JTC 1/SC 29/WG 11; 15th Meeting: Gothenburg, SE Document JVET-O0219-v1 (Jul. 2019). (4 pages).

Yeo., C. et al., "Mode-Dependent Transforms for Coding Directional Intra Prediction Residuals", IEEE Transactions on Circuits and Systems for Video Technology, vol. 22, No. 4, Apr. 2012. (10 pages).

| Mode | 0 | 1 | 2 | 3 | ... | 35 | 36 | 37 | ... | 66 |
|---|---|---|---|---|---|---|---|---|---|---|
| TS index | 0 | 1 | 2 | 3 | ... | 33 | 32 | 31 | ... | 2 |

FIG. 2

TRANSFORM SELECTION IN A VIDEO ENCODER AND/OR VIDEO DECODER

CROSS-REFERENCE TO RELATED APPLICATIONS

This application is a continuation of Ser. No. 17/531,128, filed on Nov. 19, 2021 (status pending), which is a continuation of U.S. application Ser. No. 16/637,967, filed on Feb. 10, 2020 (now U.S. Pat. No. 11,218,716, issued on Jan. 4, 2022), which is a 35 U.S.C. § 371 National Stage of International Patent Application No. PCT/EP2019/068548, filed Jul. 10, 2019, which claims priority to U.S. provisional application No. 62/697,484, filed on Jul. 13, 2018. The above identified applications are incorporated by this reference.

TECHNICAL FIELD

This disclosure relates to video encoding and/or decoding.

BACKGROUND

This disclosure relates to the encoding and/or decoding of a video sequence, which consists of a sequence of pictures.

Components

Each picture of the video sequence consists of one or more components. Each component can be described as a two-dimensional rectangular array of sample values (or "samples" for short). It is common that a picture in a video sequence consists of three components: i) a luma component (Y), where the sample values are luma values; ii) a first chroma component (Cb), where the sample values are chroma values; and iii) a second chroma component (Cr), where the sample values are chroma values.

Other examples include Y'Cb Cr, YUV and $IC_TC_P$. In $IC_TC_P$, I is the "intensity luma" component. For the remainder of this document we may refer to any luma component Y', Y or I as Y or simply luma. It is common that the dimensions of the chroma components are smaller than the luma components by a factor of two in each dimension. For example, the size of the luma component of an HD picture would be 1920×1080 and the chroma components would each have the dimension of 960×540. Components are sometimes referred to as color components.

Blocks and Units

A block is one two-dimensional array of samples corresponding to an area of a picture, and a unit consists of one or more blocks. In video coding, each component is split into blocks and the coded video bit stream consist of a series of blocks. A "transform block" is a block to which a transform is applied. A "prediction block" is a block to which a single prediction mode is applied.

It is common in video coding that the picture is split into units that cover a specific area of the picture, referred to as a "picture area." Each unit consists of all blocks that make up that picture area and each block belongs fully to one unit. The Coding Unit (CU) in HEVC is an example of a unit.

In HEVC, some decoding processes are done at the Coding Unit level, some are done at the prediction blocks, and some at the transform blocks.

In HEVC, there are two kinds of prediction types for a prediction block: intra prediction, which only uses prediction from previous decoded samples of the current picture for prediction, and inter prediction, which uses prediction from at least one previously decoded picture. A prediction block that is generated using intra prediction can be called an "intra block," and a prediction block generated using inter prediction can be called an "inter block."

In the current versatile video coding (VVC) standardization development, a CU can implicitly be divided into multiple of transform blocks. Implicit transform blocks can however only appear when the CU size has a width or height that is larger than the maximum transform size. When a CU prediction type is intra prediction, the same transform block implicit split mechanism is applied to prediction block. The size of transform block is the same as the size of prediction block when CU prediction type is intra prediction. In other words, the transform and prediction operate on the same two-dimensional array when CU prediction type is intra prediction.

Intra Prediction

In HEVC, the intra prediction generates the samples for a prediction block based on samples from previously decoded CUs of the same picture. These samples are referred to as "reference samples." When a previously decoded CU is not available, the corresponding reference samples are padded from the nearest available left-bottom or right-top reference samples.

In HEVC, there are 35 intra prediction modes: DC, planar and 33 angular modes. Each of these 33 angular modes represent a pre-defined prediction direction. The intra prediction then follows the direction to predict samples for a prediction block corresponding to an area of the picture based on spatial extrapolation of reference samples corresponding to a neighboring area of the picture.

The current VVC development defines a set of tools called bench mark sets (BMS). The BMS consists of tools that are likely for inclusion in the standard. The BMS extends the existing HEVC's intra directions to support up to 67 intra prediction modes.

Residual, Primary Transform and Quantization

A residual block consists of residual samples that are obtained by taking the sample value difference between the original samples ("original block") corresponding to an area of the picture and the predicted samples corresponding to the area of the picture (i.e., the predicted block for the area of the picture). The residual block is further processed by using a spatial core transform to produce primary-transformed (DCT/DST transformed) transform coefficients. The transform is a process to decorrelate the information of the residual block into frequency domain. In HEVC, the types of spatial core transform include DCT-II and 4×4 DST-VII. The spatial core transform is sometimes referred to as primary transform.

The resulting primary-transformed (DCT/DST transformed) transform coefficients (or simply "transform coefficients" for short) are then quantized according to a quantization parameter (QP) which controls the precision of the quantized coefficients. The quantized coefficients can be referred to as residual coefficients. A high QP would result in low precision of the coefficients and thus low fidelity of the residual block. The non-zero residual coefficients are signaled in the video bit stream. A decoder then receives the non-zero residual coefficients, applies inverse quantization and inverse transform to derive the residual block. If all residual coefficients are 0 after quantization, a flag is signaled in the video bit stream, therefore a decoder does not need to apply inverse quantization and inverse transform for the block.

Non-Separable Secondary Transform (NSST)

NSST is applied for intra blocks (i.e., is applied when the residual block is generated using a predicted block that was generated suing intra prediction). It is a secondary transform which operates on the transform coefficients. On the encoder side, a forward NSST is applied between forward core transform and quantization. On the decoder side, an inverse NSST is applied between de-quantization and inverse core transform. In the current VVC, the NSST is applied only on the low-frequency transformed coefficients, i.e. top-left 4×4 transformed coefficients.

BMS tools improve the adaptability of transform process since the DCT/DST-based transform cannot fully decorrelate the residual signal, especially when there are strong directional information present.

For each of the angular modes, a NSST transform set of 3 different matrices is defined. For DC or planar mode, a NSST transform set of 2 different matrices is defined. In BMS, each NSST transform set is assigned an index, which identifies the transform set. A mapping between the intra prediction modes and the NSST transform set indices is defined using a look-up table. That is, a look-up table is used to map each of the intra prediction modes to an transform set index, thereby mapping each of the intra prediction modes to the transform set identified by the index to which the intra prediction mode is mapped.

Cross-Component Prediction

BMS includes cross-component linear model (CCLM) prediction modes. CCLM is a special intra prediction method for the chroma component. The chroma samples are predicted based on the reconstructed luma samples by using a linear model as follows: $pred\_C(i,j) = \alpha \cdot rec\_L'(i,j) + \beta$, where $pred\_C(i,j)$ represents the predicted chroma samples in a CU and $rec\_L'(i,j)$ represents the downsampled reconstructed luma samples (in case chroma has reduced resolution compared to luma). Parameters $\alpha$ and $\beta$ are derived by minimizing the regression error between the neighboring reconstructed luma and chroma samples around the prediction block.

SUMMARY

When CCLM is used to generate a particular prediction block comprising chroma components (i.e., a chroma component prediction block), the current solution uses the intra planar mode as the entry for selecting the transform set (e.g., NSST transform set) for the particular prediction block—i.e., the transform set that is used to transform the transform coefficients that were generated by transforming the residual block that was generated based on the particular prediction block. The selected transform set, however, might not be well suitable because there can be a directional pattern present in the prediction block (e.g., in the chroma component).

To overcome this problem, this disclosure describes an improved process for selecting the transform set for a prediction block. The process can be used in both an encoder and a decoder. For example, the process can be used in both an encoder and a decoder for a prediction block that has been predicted from a reference block. In some embodiments, both the prediction block and the reference block are intra blocks.

In one embodiment (i.e., an encoder embodiment), the process includes determining a directional pattern in a prediction block of one of the pictures in the video sequence, wherein the determining comprises using information from a reference block from which the prediction block is generated to determine the directional pattern. The method also includes selecting a transform set (e.g., an NSST transform set) for the prediction block based on the determined directional pattern. The method further includes using the transform set selected for the prediction block based on the determined directional pattern transform transforming data derived from the prediction block (e.g., a residual block derived from the prediction block and an original block or transform coefficients generated as a result of transforming the residual block).

In another embodiment (i.e., a decoder embodiment), the process includes determining a directional pattern in a prediction block of one of the pictures in the video sequence, wherein the determining comprises using information from a reference block from which the prediction block is generated to determine the directional pattern. The process also includes selecting an inverse transform set (e.g., an inverse NSST transform set) for the prediction block based on the determined directional pattern. The process further includes inverse transforming data (e.g., a transform coefficient block after de-quantization) using the inverse transform set selected based on the determined directional pattern.

In some embodiments, the reference block has an intra prediction mode, and determining the directional pattern comprises or consists of determining the reference block's intra prediction mode. In some embodiments, the process further comprises maintaining mapping information that maps each intra prediction mode included in a particular set of intra prediction modes to a transform set index, the reference block's intra prediction mode is included in the particular set of intra prediction modes, and selecting the transform set or inverse transform set comprises using the mapping information to identify the transform set index to which the reference block's intra prediction mode is mapped.

In some embodiments, the prediction block belongs to a chroma color component and the reference block belongs to a luma color component.

In some embodiments, the process further comprises generating the prediction block using the reference block and a cross-component linear model (CCLM) prediction mode.

In some embodiments, the prediction block belongs to a color component and the reference block belongs to the same color component.

In some embodiments, the process further includes generating the prediction block using the reference block and an intra block copy (IBC) tool.

In some embodiments, determining the directional pattern includes the following steps: defining a set of two or more intra prediction modes, the set of set of two or more intra prediction modes comprising the intra prediction mode of the reference block and a second intra prediction mode; for each intra prediction mode included in the set of intra prediction modes, generating a temporary block; and using the generated temporary blocks and the prediction block to select one of the intra prediction modes from the set of intra prediction modes, wherein the selected intra prediction mode represents the directional pattern such that the transform set is selected based on the selected intra prediction mode.

In some embodiments, the encoding process further includes determining that a set of conditions is satisfied, wherein the step of transforming the data using the transform set selected based on the determined directional pattern is performed as a result of determining that the set of conditions is satisfied.

In some embodiments, the decoding process further includes determining that a set of conditions is satisfied, wherein the step of transforming the data using the transform set selected based on the determined directional pattern is performed as a result of determining that the set of conditions is satisfied.

In some embodiments, determining that the set of conditions is satisfied comprises: determining the prediction block's intra prediction mode; and determining that the prediction block's intra prediction mode satisfies a certain condition (e.g., is above a first threshold (T1), where T1 may equal 66).

In some embodiments, determining that the set of conditions is satisfied comprises determining that the prediction block was generated using CCLM.

In some embodiments, determining that the set of conditions is satisfied comprises: determining the number of non-zero transform coefficients (N) of the reference block; and determining that N satisfies a certain condition (e.g., N is at or below a certain threshold (T2)).

In some embodiments, determining that the set of conditions is satisfied comprises: determining the QP used for the reference block; and determining that the QP satisfies a certain condition (e.g., QP is at or above a certain threshold (T3)).

In some embodiments, determining that the set of conditions is satisfied comprises determining that a particular flag received from an encoder is set to a certain value. Thus, in some embodiments, a block level flag can be signaled in the video bit stream. In such an embodiment, the reference block is used to determine the directional pattern only when the flag is set to 1 (or other predefined value).

In some embodiments, transforming data using the transform set selected based on the determined directional pattern comprises transforming a residual block using the selected transform set.

In some embodiments, transforming data using the transform set selected based on the determined directional pattern comprises using a primary transform unit to transform a residual block to produce the data and using the selected transform set to transform the data.

BRIEF DESCRIPTION OF THE DRAWINGS

The accompanying drawings, which are incorporated herein and form part of the specification, illustrate various embodiments.

FIG. 2 illustrates an example table mapping intra prediction modes to a particular transform set index.

DETAILED DESCRIPTION

Figure 1:
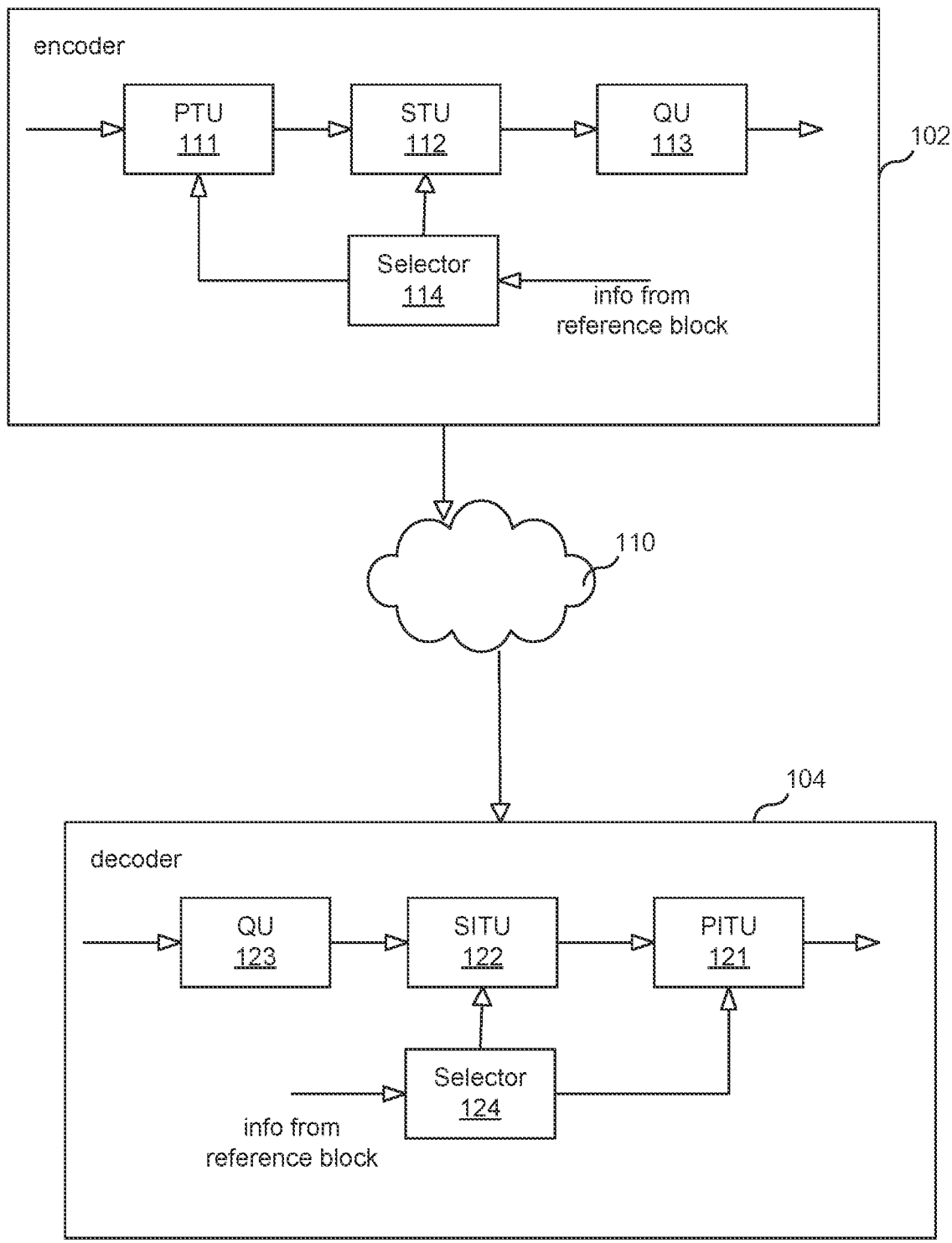
FIG. 1 illustrates a system according to an embodiment.

FIG. 1 illustrates a system 100 according to an example embodiment. System 100 includes an encoder 102 in communication with a decoder 104 via a network 110 (e.g., the Internet or other network).

Encoder 102 includes a primary transform unit (PTU) 111, a secondary transform unit (STU) 112 (e.g., an NSST unit), and a quantization unit (QU) 113. As explained above, primary transform unit 111 may implement a spatial core transform that performs a process to decorrelate a residual block into frequency domain (i.e., produce transform coefficients), secondary transform unit 112 may be applied for intra blocks and may operate on the transform coefficients (i.e., the output of primary transform unit 111) to produce coefficients that will be quantized by quantization unit 113 according to a QP which controls the precision of the quantized coefficients. Likewise, decoder 104 includes a de-quantization unit 123, an inverse second transform unit 122, and an inverse primary transform unit 121.

As further shown in FIG. 1, each of the encoder 102 and the decoder 104 may include a selector 114, 124 that functions to select a transform set (e.g., a primary transform set or a secondary transform set) or an inverse-transform set, respectively, for a prediction block. Advantageously, in some scenarios, the selector 114, 124 determines a directional pattern in the prediction block using information from the reference block from which the prediction block is predicted and then selects the transform set (or inverse-transform) based on the determined directional pattern. In some embodiments, both the prediction block and the reference block are intra blocks. In some embodiments, determining the directional pattern comprises or consists of the transform selector 114, 124 determining the intra prediction mode of the reference block and/or reconstructed sample values of the reference block.

For example, in one embodiment, selector 114 selects the transform set for the prediction block by determining the intra prediction mode of the reference block used to generate the prediction block (i.e., the prediction block's reference block) and then uses information (e.g., a table) that maps each intra prediction mode included in a set of intra prediction modes to a particular transform set (e.g., to a transform set index that identifies a transform set) to select the transform set to which the determined intra prediction mode is mapped.

Figure 2:
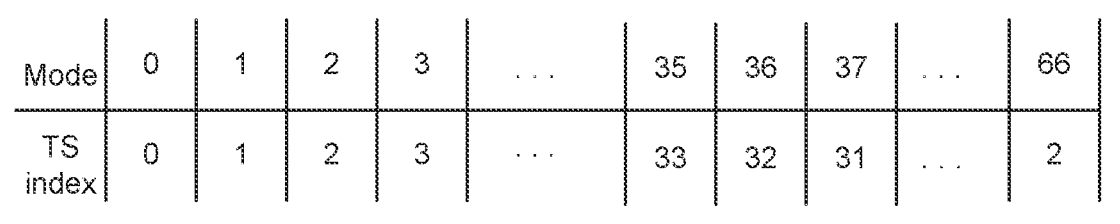

FIG. 2 illustrates an example table mapping each one of intra prediction modes 0 to 66 to a transform set index. Thus, for example, if selector 114 determines that the intra prediction mode of the prediction block's reference block is 66, then selector 114 will select for the prediction block the transform set identified by transform set index 2. In other words, in one embodiment, selecting the transform set for the prediction block using the determined directional pattern consists of using the intra prediction mode for the reference block as the entry for selecting the transform set.

The selected transform set is then applied by the primary transform unit 111 or secondary transform unit 112, and the selected inverse-transform is then applied by the primary inverse transform unit 121 or the secondary inverse transform unit 122. An advantage of this process is that is provides better de-correlation of chroma components' residual signal when, for example, CCLM is used.

In one embodiment, the selected transform set is a NSST transform set or any other directional-dependent transform set. The selected transform set for the prediction block can be used either as a primary transform which operates on the residual block generated based on the prediction block and the original block corresponding to the prediction block or used as a secondary transform which operates on the transform coefficients produced as a result of the primary transform unit transforming the residual block. The process can be applied for a single color component or to all color components. Examples of color components are luma, Cb and Cr.

In some embodiments, the prediction block belongs to a chroma color component and the reference block belongs to a luma color component. One example is when CCLM mode is used. In some embodiments, both the prediction block and reference block belong to the same color component. One example is when the intra block copy (IBC) tool in range extension of HEVC is used. The tool creates a prediction block by referencing previously coded blocks in the same picture or slice. Preferably, this embodiment is applied when the picture or slice is intra.

In some embodiments, determining the directional pattern in the prediction block using information from the reference block comprises selector 114, 124 selecting an intra prediction mode using both the reference block's intra prediction mode and the prediction block. Selector 114 (124) then uses the selected intra prediction mode to directly select the transform set (inverse transform set). For example, when CCLM is used, the generation process for the prediction block involves downsampling and linear mapping of the referenced luma block's reconstructed samples.

In one embodiment, the following steps are performed by selector 114 (124) to select the intra prediction mode that will be used to select the transform set (inverse-transform set):

Firstly, a set of intra prediction modes is defined. The set includes the reference block's intra prediction mode (L_dir) and includes a few additional modes. The additional modes can contain the adjacent modes to L_dir, it can also contain non-adjacent intra prediction mode DC or planar.

Figure 3:
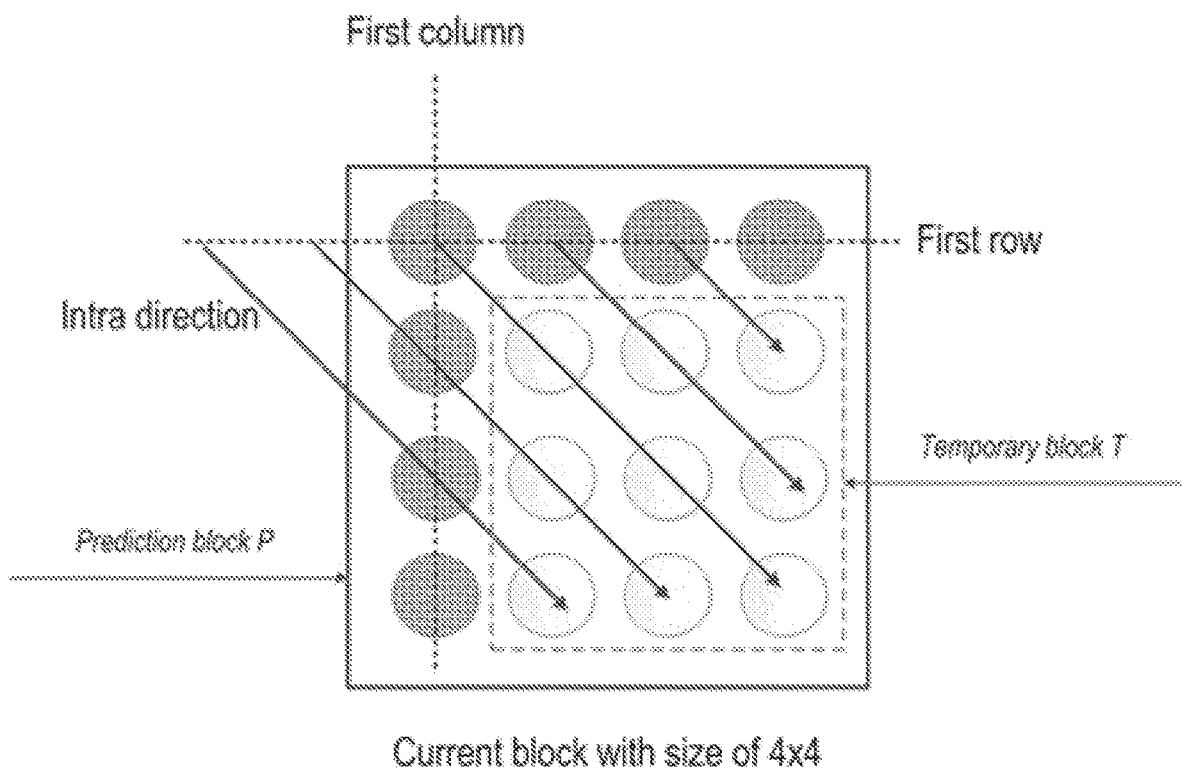
FIG. 3 illustrates a 4×4 block.

For each mode included in the set, the selector 114, 124 uses samples from the first row and first column of the prediction block (P) (assuming the size is M×N) to predict the remaining samples (size of (M−1)×(N−1)) inside P. An example is shown in FIG. 3. In other words, for each mode included in the set, a temporary block T with (M−1)×(N−1) is generated using intra prediction method.

After the block T is generated, the samples in T are compared against the corresponded samples of P. The comparison can be done by calculating the sum of absolute difference (SAD), as shown below.

$$SAD = \sum_{i,j} |P_{i,j} - T_{i,j}|$$

The intra prediction mode that gives the smallest SAD is selected to represent the directional pattern (i.e., is the selected intra prediction mode that is used to directly select the transform (inverse-transform) set.

Figure 4:
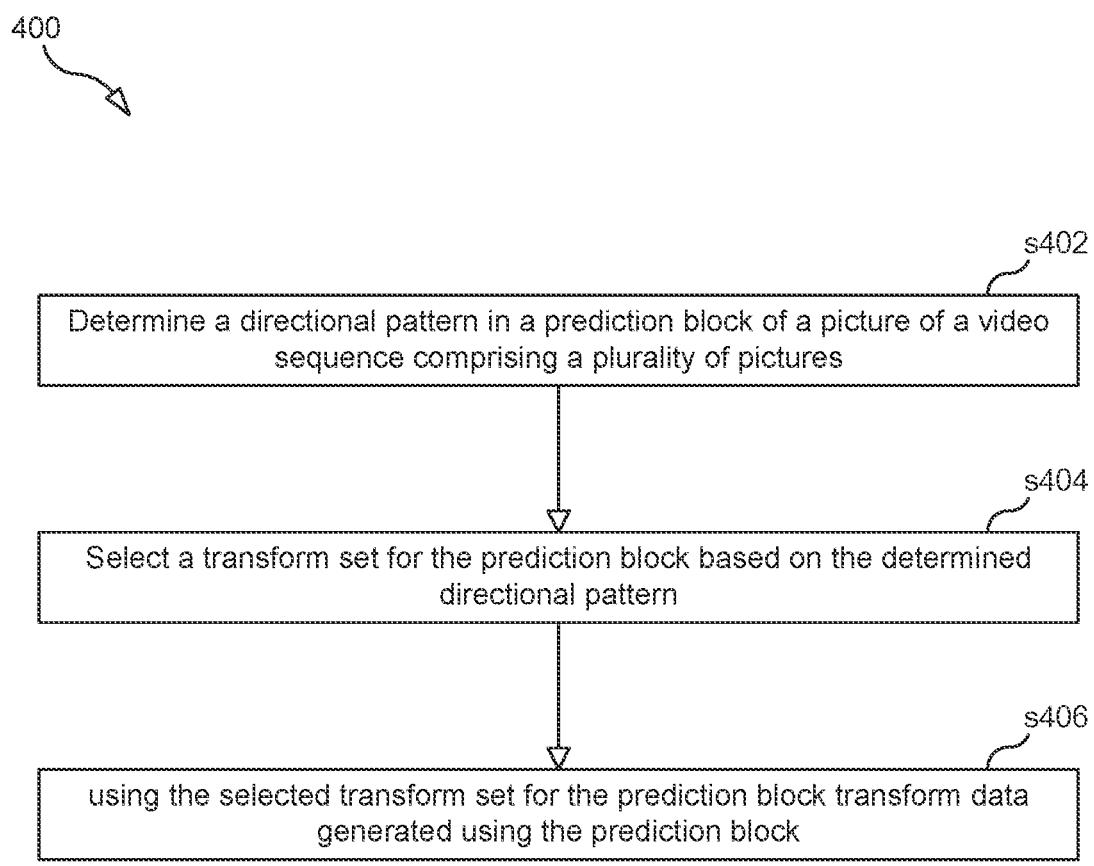
FIG. 4 illustrates a process according to one embodiment.

FIG. 4 is a flow chart illustrating a process 400, according to an embodiment, that is performed by encoder 102.

Process 400 may begin in step s402 in which selector 114 determines a directional pattern in a prediction block of one of the pictures in the video sequence, wherein the determining comprises using information from a reference block from which the prediction block is generated to determine the directional pattern.

In some embodiments, determining the directional pattern comprises or consists of the selector 114 determining the reference block's intra prediction mode.

In step s404, selector 114 selects a transform set for the prediction block based on the determined directional pattern (e.g., based on the reference block's intra prediction mode).

In step s406, a transform unit of encoder 102 (e.g., primary transform unit 111 or secondary transform unit 112) uses the transform set selected for the prediction block based on the determined directional pattern to transform data derived from the prediction block (e.g., a residual block derived from the prediction block and an original block or transform coefficients generated as a result of transforming the residual block derived from the prediction block). For example, primary transform unit 111 transforms the residual block using the selected transform set or secondary transform unit 112 transforms the output of primary transform unit 111 using the selected transform set.

Figure 5:
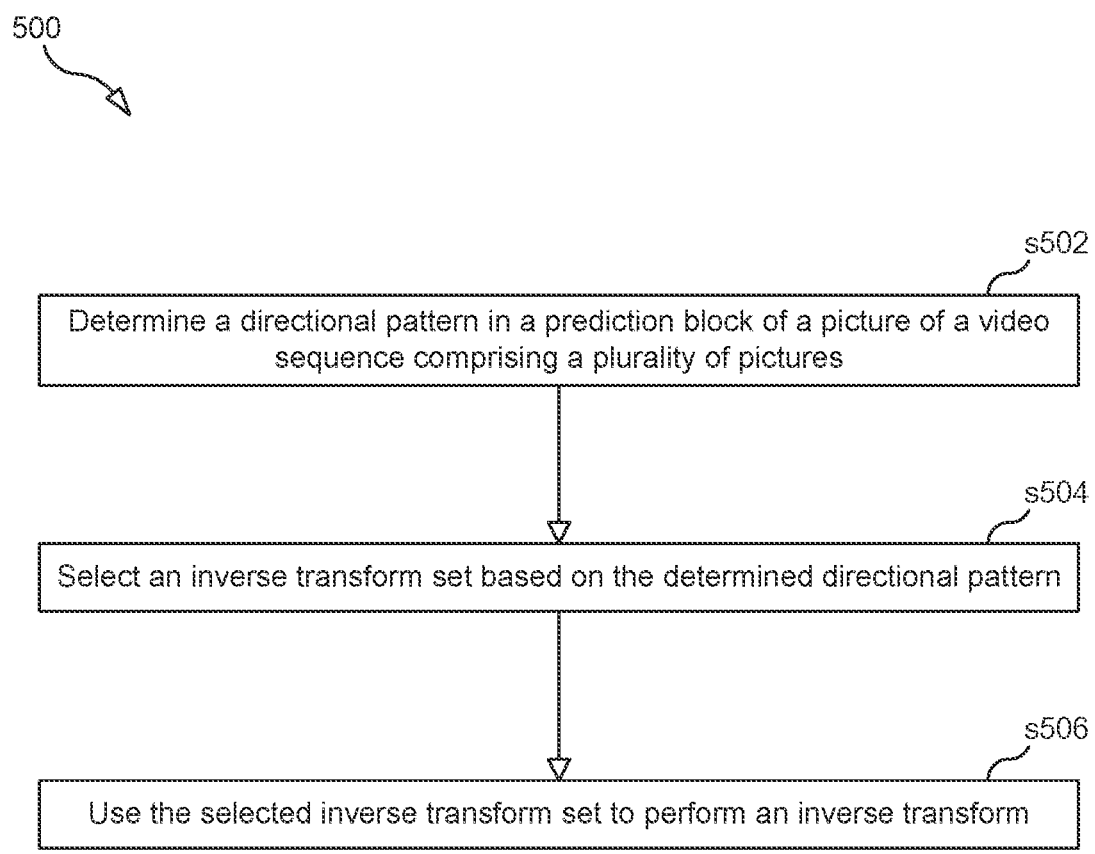
FIG. 5 illustrates a process according to one embodiment.

FIG. 5 is a flow chart illustrating a process 500, according to an embodiment, that is performed by decoder 104.

Process 500 may begin in step s502 in which selector 124 determines a directional pattern in a prediction block of one of the pictures in the video sequence, wherein the determining comprises using information from a reference block from which the prediction block is generated to determine the directional pattern.

In step s504, selector 124 selects an inverse transform set (e.g., an inverse NSST transform set) for the prediction block based on the determined directional pattern.

In step s506, an inverse transform unit of decoder 104 (e.g., primary inverse transform unit 121 or secondary inverse transform unit 122) inverse transforms data using the inverse transform set selected based on the determined directional pattern. For example, primary transform unit 121 inverse transforms the output of secondary transform unit 122 using the selected inverse transform set or secondary inverse transform unit 122 inverse transforms the output of the de-quantization unit 123 using the selected inverse transform set.

In some embodiments, process 400 and/or 500 further comprises maintaining mapping information (e.g., a table) that maps each intra prediction mode included in a particular set of intra prediction modes (e.g., modes 0 to 66) to a transform set index that identifies a transform set. The reference block's intra prediction mode is included in the particular set of intra prediction modes, and selecting the transform set (or inverse transform set) comprises using the mapping information to identify the transform set index to which the reference block's intra prediction mode is mapped.

In some embodiments, the prediction block belongs to a chroma color component and the reference block belongs to a luma color component.

In some embodiments, the process further includes generating the prediction block using the reference block and a cross-component linear model (CCLM) prediction mode.

In some embodiments, the prediction block belongs to a color component and the reference block belongs to the same color component.

In some embodiments, the process also includes generating the prediction block using the reference block and an intra block copy (IBC) tool.

In some embodiments, determining the directional pattern comprises: defining a set of two or more intra prediction modes, the set of set of two or more intra prediction modes comprising the intra prediction mode of the reference block and a second intra prediction mode; for each intra prediction mode included in the set of intra prediction modes, generating a temporary block; and using the generated temporary blocks and the prediction block to select one of the intra prediction modes from the set of intra prediction modes, wherein the selected intra prediction mode represents the directional pattern such that the transform set is selected based on the selected intra prediction mode.

Figure 6:
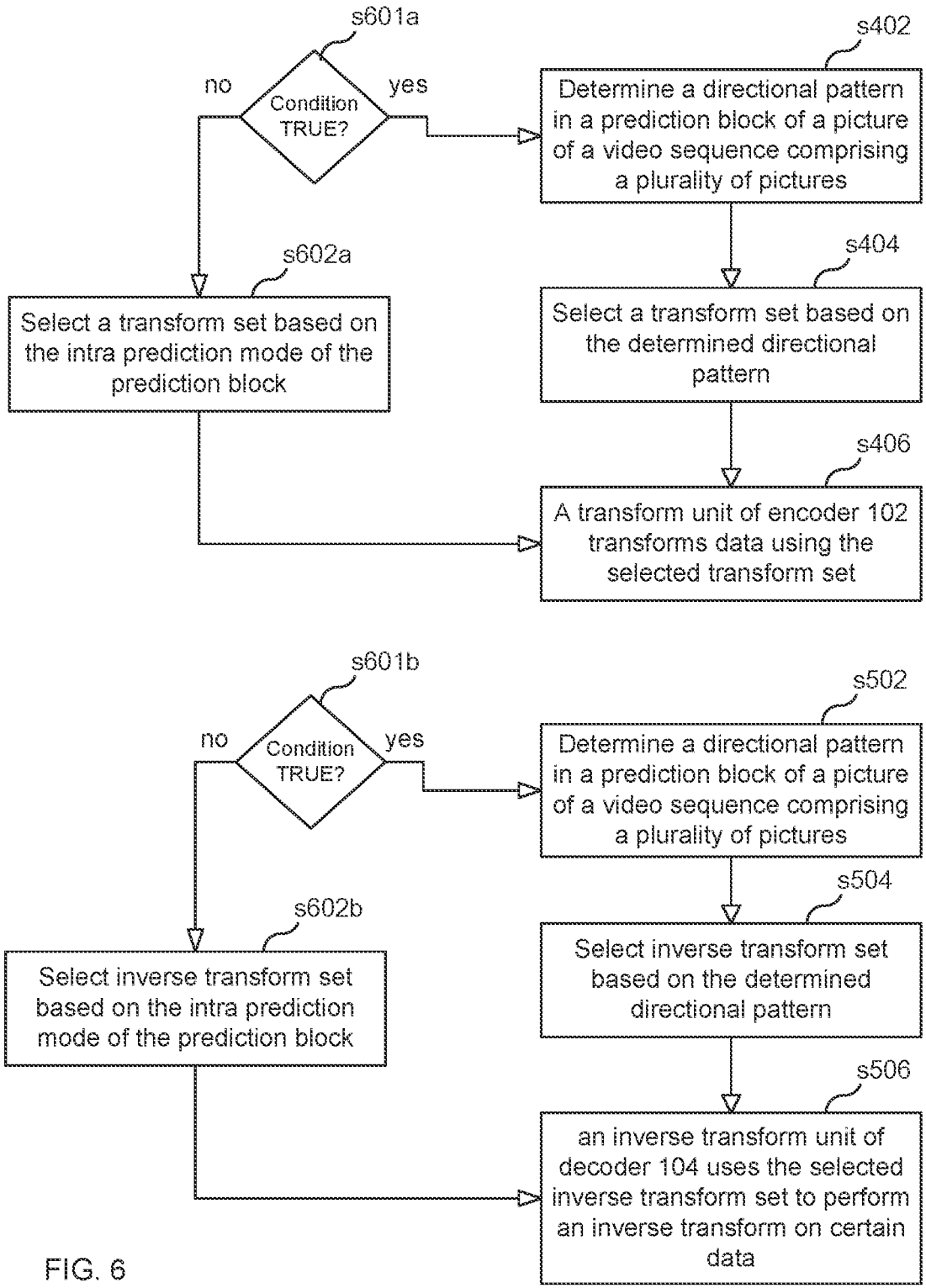
FIG. 6 illustrates processes according to one embodiment.

As illustrated in FIG. 6, in some embodiments, process 400 and 500 further include determining that a set of one or more conditions is satisfied (see steps s601a and s601b, respectively), wherein the data is transformed (inverse transformed) using the transform (inverse transform) set selected in step s404 (s504) as a result of determining that the set of conditions is satisfied. That is, if the set of conditions are not satisfied, the data will be transformed using the transform set selected in the conventional manner (e.g., selected based on the prediction block's intra prediction mode) (see steps s602a and s602b).

In some embodiments, determining that the set of conditions is satisfied comprises: determining the prediction block's intra prediction mode; and determining that the prediction block's intra prediction mode satisfies a certain condition (e.g., is above a first threshold (T1), where T1 may equal 66).

In some embodiments, determining that the set of conditions is satisfied comprises determining that the prediction block was generated using CCLM.

In some embodiments, determining that the set of conditions is satisfied comprises: determining the number of non-zero transform coefficients (N) of the reference block; and determining that N satisfies a certain condition (e.g., N is at or below a certain threshold (T2)).

In some embodiments, determining that the set of conditions is satisfied comprises: determining the QP used for the reference block; and determining that the QP satisfies a certain condition (e.g., QP is at or above a certain threshold (T3)).

In some embodiments, determining that the set of conditions is satisfied comprises determining that a particular flag received from an encoder is set to a certain value.

Figure 7:
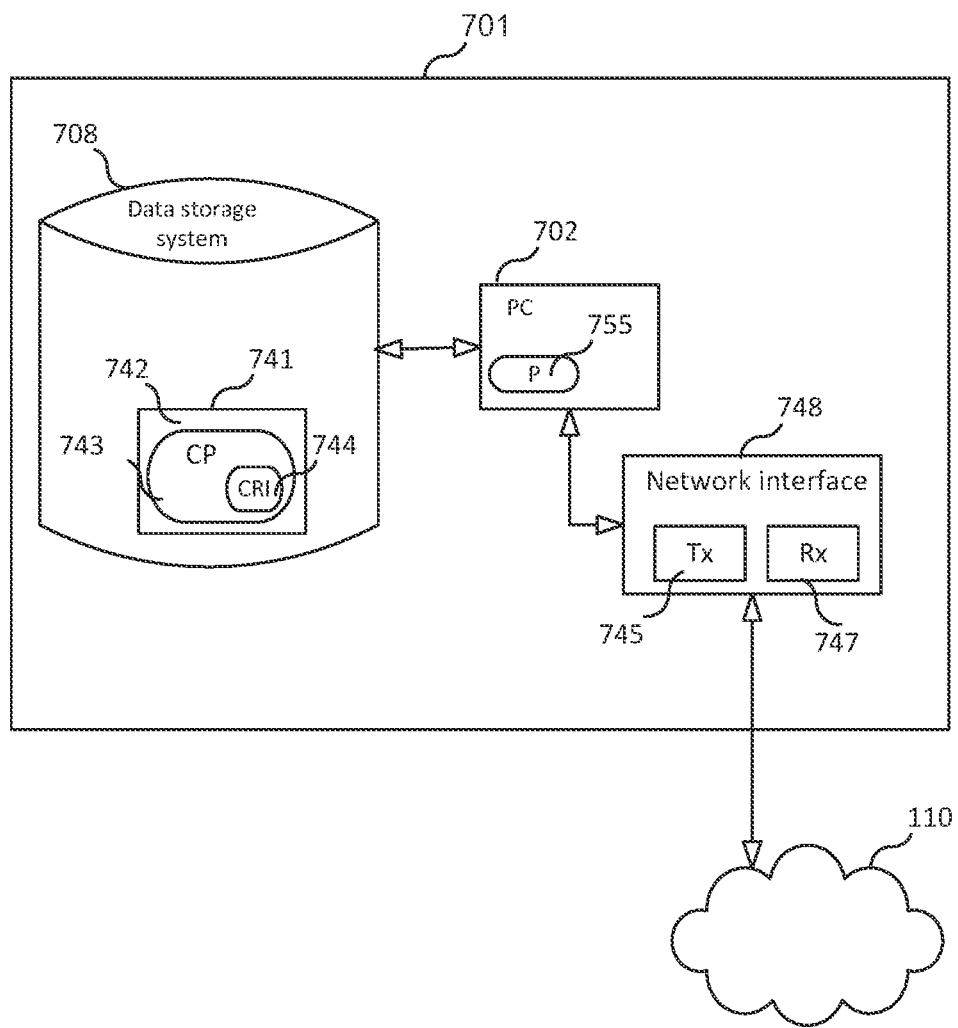
FIG. 7 is a block diagram of an apparatus according to one embodiment.

FIG. 7 is a block diagram of an apparatus 701 for implementing encoder 102 or decoder 104, according to some embodiments. As shown in FIG. 7, network apparatus 701 may comprise: processing circuitry (PC) 702, which may include one or more processors (P) 755 (e.g., one or more general purpose microprocessors and/or one or more other processors, such as an application specific integrated circuit (ASIC), field-programmable gate arrays (FPGAs), and the like), which processors may be co-located in a single housing or data center or may be geographically distributed; a network interface 748 comprising a transmitter (Tx) 745 and a receiver (Rx) 747 for enabling apparatus 701 to transmit data to and receive data from other nodes connected to network 110 (e.g., an Internet Protocol (IP) network) to which network interface 748 is connected; and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes apparatus 701 to perform steps described herein (e.g., steps described herein with reference to the flow charts). In other embodiments, apparatus 701 may be configured to perform steps described herein without the need for code. That is, for example, PC 702 may consist merely of one or more ASICs. Hence, the features of the embodiments described herein may be implemented in hardware and/or software.

An advantage of the processes described herein is that they provide better de-correlation of chroma components' residual signal, particularly when CCLM is used. One example is when the luma and chroma components are using the same CU split. The method is applied on chroma components which are predicted by CCLM. The luma intra prediction mode is used to select the NSST transform set. The reference is VVC with BMS setting. The BD rate performance with all intra configuration is provided as follows:

|  | Y | U | V |
| --- | --- | --- | --- |
| Class A1 | −0.07% | −0.51% | −0.77% |
| Class A2 | −0.01% | −0.31% | −0.32% |
| Class B | −0.01% | −0.24% | −0.24% |
| Class C | 0.04% | −0.23% | −0.35% |
| Class E | 0.02% | −0.32% | 0.04% |
| Overall | 0.00% | −0.30% | −0.32% |
| Class D | 0.04% | −0.31% | −0.35% |

EMBODIMENTS

1. A method for encoding a video sequence comprising a plurality of pictures, the method comprising: determining (s402) a directional pattern in a prediction block of one of the pictures in the video sequence, wherein the determining comprises using information from a reference block from which the prediction block is generated to determine the directional pattern; selecting (s404) a transform set (e.g., an NSST transform set) for the prediction block based on the determined directional pattern; and using (s406) the transform set selected for the prediction block based on the determined directional pattern transform transforming data derived from the prediction block (e.g., a residual block derived from the prediction block and an original block or transform coefficients generated as a result of transforming the residual block).

2. A method for decoding a video sequence comprising a plurality of pictures, the method comprising: determining (s502) a directional pattern in a prediction block of one of the pictures in the video sequence, wherein the determining comprises using information from a reference block from which the prediction block is generated to determine the directional pattern; selecting (s504) an inverse transform set (e.g., an inverse NSST transform set) for the prediction block based on the determined directional pattern; and inverse transforming (s506) data (e.g., a transform coefficient block after de-quantization) using the inverse transform set selected based on the determined directional pattern.

3. The method of embodiment 1 or 2, wherein the reference block has an intra prediction mode, and determining the directional pattern comprises or consists of determining the reference block's intra prediction mode.

4. The method of embodiment 3, wherein the method further comprises maintaining mapping information that maps each intra prediction mode included in a particular set of intra prediction modes to a transform set index, the reference block's intra prediction mode is included in the particular set of intra prediction modes, and selecting the transform set or inverse transform set comprises using the mapping information to identify the transform set index to which the reference block's intra prediction mode is mapped.

5. The method of any one of embodiments 1-4, wherein the prediction block belongs to a chroma color component and the reference block belongs to a luma color component.

6. The method of embodiment 5, further comprising generating the prediction block using the reference block and a cross-component linear model (CCLM) prediction mode.

7. The method of any one of embodiments 1-4, wherein the prediction block belongs to a color component and the reference block belongs to the same color component.

8. The method of embodiment 7, further comprises generating the prediction block using the reference block and an intra block copy (IBC) tool.

9. The method of any one of embodiments 3-8, wherein determining the directional pattern comprises: defining a set of two or more intra prediction modes, the set of set of two or more intra prediction modes comprising the intra prediction mode of the reference block and a second intra prediction mode; for each intra prediction mode included in the set of intra prediction modes, generating a temporary block; and using the generated temporary blocks and the prediction block to select one of the intra prediction modes from the set of intra prediction modes, wherein the selected intra prediction mode represents the directional pattern such that the transform set is selected based on the selected intra prediction mode.

10. The method of any one of embodiments 1 or 3-9, further comprising determining that a set of conditions is satisfied, wherein the step of transforming the data using the transform set selected based on the determined directional pattern is performed as a result of determining that the set of conditions is satisfied.

11. The method of any one of embodiments 2 or 3-9, further comprising determining that a set of conditions is satisfied, wherein the step of transforming the data using the transform set selected based on the determined directional pattern is performed as a result of determining that the set of conditions is satisfied.

12. The method of embodiment 10 or 11, wherein determining that the set of conditions is satisfied comprises: determining the prediction block's intra prediction mode; and determining that the prediction block's intra prediction mode satisfies a certain condition (e.g., is above a first threshold (T1), where T1 may equal 66).

13. The method of embodiment 10 or 11, wherein determining that the set of conditions is satisfied comprises determining that the prediction block was generated using CCLM.

14. The method of any one of embodiments 10-13, wherein determining that the set of conditions is satisfied comprises: determining the number of non-zero transform coefficients (N) of the reference block; and determining that N satisfies a certain condition (e.g., N is at or below a certain threshold (T2)).

15. The method of any one of embodiments 10-14, wherein determining that the set of conditions is satisfied comprises: determining the QP used for the reference block; and determining that the QP satisfies a certain condition (e.g., QP is at or above a certain threshold (T3)).

16. The method of embodiment 11, wherein determining that the set of conditions is satisfied comprises determining that a particular flag received from an encoder is set to a certain value.

17. The method of embodiment 1, wherein transforming data using the transform set selected based on the determined directional pattern comprises transforming a residual block using the selected transform set.

18. The method of embodiment 1, wherein transforming data using the transform set selected based on the determined directional pattern comprises using a primary transform unit to transform a residual block to produce the data; and using the selected transform set to transform the data.

19. An encoder (102) for encoding a video sequence comprising a plurality of pictures, the encoder being adapted to: determine a directional pattern in a prediction block of one of the pictures in the video sequence, wherein the determining comprises using information from a reference block from which the prediction block is generated to determine the directional pattern; select a transform set (e.g., an NSST transform set) for the prediction block based on the determined directional pattern; and use the transform set selected for the prediction block based on the determined directional pattern transform transforming data derived from the prediction block (e.g., a residual block derived from the prediction block and an original block or transform coefficients generated as a result of transforming the residual block).

20. A decoder (104) for decoding a video sequence comprising a plurality of pictures, the decoder being adapted to: determine a directional pattern in a prediction block of one of the pictures in the video sequence, wherein the determining comprises using information from a reference block from which the prediction block is generated to determine the directional pattern; select an inverse transform set (e.g., an inverse NSST transform set) for the prediction block based on the determined directional pattern; and inverse transform (s506) data (e.g., a transform coefficient block after de-quantization) using the inverse transform set selected based on the determined directional pattern.

Figure 8:
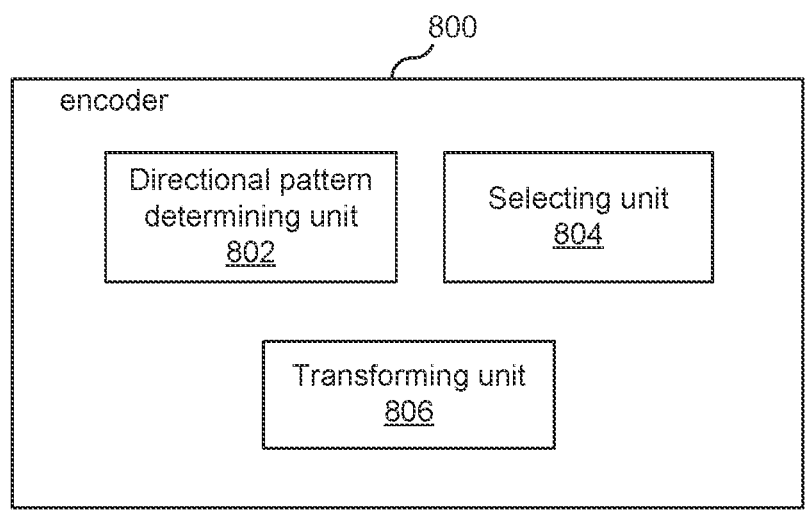
FIG. 8. illustrates functional units of an encoder according to an embodiment.

21. An encoder (800, see FIG. 8) for encoding a video sequence comprising a plurality of pictures, the encoder comprising: a directional pattern determining unit (802) for determining a directional pattern in a prediction block of one of the pictures in the video sequence, wherein the determining comprises using information from a reference block from which the prediction block is generated to determine the directional pattern; a selecting unit (804) for selecting a transform set (e.g., an NSST transform set) for the prediction block based on the determined directional pattern; and a transforming unit (806) for using the transform set selected by the selecting unit based on the determined directional pattern transform transforming data derived from the prediction block (e.g., a residual block derived from the prediction block and an original block or transform coefficients generated as a result of transforming the residual block).

Figure 9:
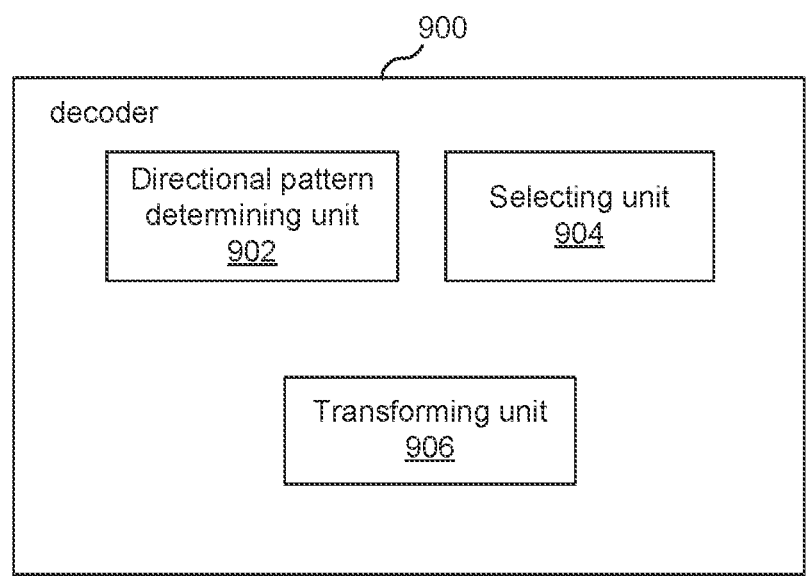
FIG. 9. illustrates functional units of an encoder according to an embodiment.

22. A decoder (900, see FIG. 9) for decoding a video sequence comprising a plurality of pictures, the decoder being adapted to: a directional pattern determining unit (902) for determining a directional pattern in a prediction block of one of the pictures in the video sequence, wherein the determining comprises using information from a reference block from which the prediction block is generated to determine the directional pattern; a selecting unit (904) for selecting an inverse transform set (e.g., an inverse NSST transform set) for the prediction block based on the determined directional pattern; and an transforming unit (906) for inverse transforming (s506) data (e.g., a transform coefficient block after de-quantization) using the inverse transform set selected by the selecting unit based on the determined directional pattern.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for decoding a video sequence comprising a plurality of pictures, the method comprising:
    obtaining an intra prediction mode value (predModeIntra) specifying an intra prediction mode;
    selecting an index value (lfnstTrSetIdx) using the obtained intra prediction mode value;
    deriving a transformation matrix using the selected index value;
    obtaining an array of transform coefficients; and
    deriving transformed samples using the transformation matrix and the array of transform coefficients.

2. The method of claim 1, wherein deriving a transformation matrix using the index value comprises using the index value to select a transformation matrix from a set of two or more transformation matrices.

3. The method of claim 1, wherein
    the obtained intra prediction mode value is associated with a first two-dimensional matrix of sample values (pY), and
    the method further comprises generating a second two-dimensional matrix of sample values (predSamples) using pY.

4. The method of claim 3, wherein
    pY is a two-dimensional matrix of luma sample values, and
    predSamples is a two-dimensional matrix of chroma sample values.

5. The method of claim 4, wherein generating predSamples using pY comprises using a cross-component linear model (CCLM) prediction mode to generate predSamples.

6. The method of claim 1, further comprising determining that a set of conditions is satisfied, wherein
    the step of deriving the transformed samples is performed as a result of determining that the set of conditions is satisfied.

7. The method of claim 6, wherein determining that the set of conditions is satisfied comprises determining that a particular flag received from an encoder is set to a certain value.

8. The method of claim 1, wherein deriving the transformed samples comprises inverse transforming a coefficient block after dequantization.

9. The method of claim 1, wherein deriving the transformed samples comprises inverse transforming a coefficient block.

10. A non-transitory computer readable medium storing a computer program, the computer program comprising instructions which, when executed by processing circuitry of a decoder, causes the decoder to perform the method of claim 1.

11. A decoder for decoding a video sequence comprising a plurality of pictures, the decoder comprising:
    memory; and
    processing circuitry coupled to the memory, wherein the decoder is configured to perform a process that comprises:
    obtaining an intra prediction mode value (predModeIntra) specifying an intra prediction mode;
    selecting an index value (lfnstTrSetIdx) using the obtained intra prediction mode value;
    deriving a transformation matrix using the selected index value;
    obtaining an array of transform coefficients; and
    deriving transformed samples using the transformation matrix and the array of transform coefficients.

12. The decoder of claim 11, wherein deriving a transformation matrix using the index value comprises using the index value to select a transformation matrix from a set of two or more transformation matrices.

13. The decoder of claim 11, wherein
    the obtained intra prediction mode value is associated with a first two-dimensional matrix of sample values (pY), and
    the process further comprises generating a second two-dimensional matrix of sample values (predSamples) using pY.

14. The decoder of claim 13, wherein
    pY is a two-dimensional matrix of luma sample values, and
    predSamples is a two-dimensional matrix of chroma sample values.

15. The decoder of claim 14, wherein generating predSamples using pY comprises using a cross-component linear model (CCLM) prediction mode to generate predSamples.

16. The decoder of claim 11, wherein the process further comprises determining that a set of conditions is satisfied, wherein
    the step of deriving the transformed samples is performed as a result of determining that the set of conditions is satisfied.

17. The decoder of claim 16, wherein determining that the set of conditions is satisfied comprises determining that a particular flag received from an encoder is set to a certain value.

18. The decoder of claim 11, wherein deriving the transformed samples comprises inverse transforming a coefficient block after dequantization.

19. The decoder of claim 11, wherein deriving the transformed samples comprises inverse transforming a coefficient block.

* * * * *

UNITED STATES PATENT AND TRADEMARK OFFICE
CERTIFICATE OF CORRECTION

PATENT NO. : 11,882,302 B2
APPLICATION NO. : 18/127359
DATED : January 23, 2024
INVENTOR(S) : Yu et al.

It is certified that error appears in the above-identified patent and that said Letters Patent is hereby corrected as shown below:

In the Specification

In Column 1, Line 8, delete "2021 (status pending)," and insert -- 2021 (now U.S. Pat. No. 11,627,329, issued on Apr. 11, 2023), --, therefor.

In Column 1, Line 64, delete "previous" and insert -- previously --, therefor.

In Column 6, Line 10, delete "inverse second transform unit" and insert -- secondary inverse transform unit --, therefor.

In Column 6, Line 11, delete "inverse primary transform unit" and insert -- primary inverse transform unit --, therefor.

In Column 6, Line 53, delete "that is" and insert -- that it --, therefor.

In Column 7, Line 48, delete "(i.e.," and insert -- i.e., SAD --, therefor.

In Column 8, Line 25, delete "primary transform unit" and insert -- primary inverse transform unit --, therefor.

In Column 8, Line 26, delete "secondary transform unit" and insert -- secondary inverse transform unit --, therefor.

Signed and Sealed this
Twenty-third Day of April, 2024

Katherine Kelly Vidal
*Director of the United States Patent and Trademark Office*